United States Patent
Seifert

(10) Patent No.: US 9,092,539 B2
(45) Date of Patent: Jul. 28, 2015

(54) METHOD AND A SYSTEM FOR ANALYSING TRAFFIC ON A WEBSITE INCLUDING REDIRECTION OF TRAFFIC

(75) Inventor: Michael Seifert, Charlottenlund (DK)

(73) Assignee: SITECORE A/S, Kobenhavn V (DK)

( * ) Notice: Subject to any disclaimer, the term of this patent is extended or adjusted under 35 U.S.C. 154(b) by 860 days.

(21) Appl. No.: 13/169,805

(22) Filed: Jun. 27, 2011

(65) Prior Publication Data
US 2012/0331129 A1    Dec. 27, 2012

(51) Int. Cl.
G06F 15/173    (2006.01)
G06F 17/30    (2006.01)
H04L 29/08    (2006.01)
G06F 11/34    (2006.01)

(52) U.S. Cl.
CPC ...... G06F 17/30899 (2013.01); H04L 67/2814 (2013.01); G06F 11/34 (2013.01)

(58) Field of Classification Search
USPC .......................................................... 709/224
See application file for complete search history.

(56) References Cited

U.S. PATENT DOCUMENTS

2007/0185855 A1*  8/2007  Shah et al. .................... 707/5
2007/0265893 A1   11/2007  Nielson
2009/0049039 A1    2/2009  Ryland
2009/0112977 A1    4/2009  Hutchinson
2012/0116868 A1*   5/2012  Chin et al. ................ 705/14.43

* cited by examiner

*Primary Examiner* — Angela Nguyen
(74) *Attorney, Agent, or Firm* — Birch, Stewart, Kolasch & Birch, LLP

(57) ABSTRACT

A method and a system for analyzing traffic on a website are disclosed. The website is arranged on a server and comprises at least two webpages. A plurality of visitors is allowed to visit the website. For each visit navigations and/or actions performed by the visitor during the visit are monitored, while accumulating value points in accordance with content viewed by the visitor and actions performed by the visitor, and in accordance with predefined value point settings associated with content of the website, thereby obtaining an accumulated value point score for the visit. Furthermore, an origin of the visit, leading the visitor to the website, and a landing webpage being the first webpage of the website which the visitor visits when arriving from the origin of the visit, said landing webpage being designated by the origin, are registered.

Obtained accumulated value point scores and registered origins and landing webpages of the plurality of visits are analyzed, and, based on this, it is determined to redirect future website traffic originating from a specific origin, and having a specific landing webpage, to a target webpage of the website in the case that the analyzing step reveals that visits originating from the specific origin obtain higher accumulated value point scores when the first webpage visited by the visitor is the target webpage than when the first webpage visited by the visitor is the landing webpage which was designated by the origin.

Expected value generated for the website owner by the future traffic to the website is thereby increased.

18 Claims, 5 Drawing Sheets

METHOD AND A SYSTEM FOR ANALYSING TRAFFIC ON A WEBSITE INCLUDING REDIRECTION OF TRAFFIC

FIELD OF THE INVENTION

The present invention relates to a method and a system for analysing traffic on a website. More particularly, the present invention relates to a method and a system in which traffic being directed to the website can be redirected to a selected webpage of the website in order to increase value generated for the website owner by visitors visiting the website.

BACKGROUND OF THE INVENTION

For website owners it is often desirable to investigate whether or not the traffic on the website generates value for the website owner, e.g. in terms of visitors to the website obtaining specific goals for the website owner, such as purchasing or ordering products or services, filling in a contact form, requesting a web based demo, ordering a catalogue, staying at the website for a specific time period, etc. It may also be relevant to attempt to affect the behaviour of visitors visiting the website in order to increase the value generated for the website owner during the visits.

US 2007/0185855 A1 discloses a method for tracking information about a visitor to a website, such as how the user arrived at the website, geographical location of the user, operating system, screen size, etc. The information is used to present optimized pages for the user based on similar user preferences. The preferences are gathered from repeated behaviours of similar users.

US 2009/0049039 A1 discloses a mechanism for improving the effectiveness of an Internet search engine at directing a user to a relevant page of a website. The superior effectiveness of a website's internal search engine is used to improve the effectiveness of an external internet search engine in directing users efficiently to the webpage that contains the information or facilities that they require.

DESCRIPTION OF THE INVENTION

It is an object of embodiments of the invention to provide a method for analysing traffic on a website, in which it is possible to ensure that traffic is directed towards webpages of the website which are likely to generate value for the website owner.

It is a further object of embodiments of the invention to provide a method for analysing traffic on a website, which allows value generated for the website owner by traffic on the website to be optimized.

It is an even further object of embodiments of the invention to provide a system for analysing traffic on a website, which makes it possible to ensure that traffic is directed towards webpages of the website which are likely to generate value for the website owner.

According to a first aspect the invention provides a method for analysing traffic on a website, the website being arranged on a server, and the website comprising at least two webpages, the method comprising the steps of:
  allowing a plurality of visitors to visit the website,
  for each visit:
    monitoring navigations and/or actions performed by the visitor during the visit while accumulating value points in accordance with content viewed by the visitor and actions performed by the visitor, and in accordance with predefined value point settings associated with content of the website, thereby obtaining an accumulated value point score for the visit,
    registering an origin of the visit, leading the visitor to the website, and
    registering a landing webpage being the first webpage of the website which the visitor visits when arriving from the origin of the visit, said landing webpage being designated by the origin,
  analysing obtained accumulated value point scores and registered origins and landing webpages of the plurality of visits, and
  determining to redirect future website traffic originating from a specific origin, and having a specific landing webpage, to a target webpage of the website in the case that the analysing step reveals that visits originating from the specific origin obtain higher accumulated value point scores when the first webpage visited by the visitor is the target webpage than when the first webpage visited by the visitor is the landing webpage which was designated by the origin.

In the present context the term 'website' should be interpreted to mean a collection of related webpages, images, videos or other digital assets being addressed relative to a common Uniform Resource Locator (URL). The webpages of the website may advantageously be designed, presented and linked together to form a logical information resource and/or transaction initiation function. According to the first aspect of the invention, the website being managed is arranged on, or hosted on, a server. The server, and thereby the website, is typically accessible via a data network, such as the Internet or a Local Area Network (LAN). It should be noted that, in the present context, the term 'server' should be interpreted to cover a single device as well as two or more individual devices being interlinked in such a manner that they, to a visitor of the website, seem to act as a single device.

In the present context the term 'traffic on a website' should be interpreted to mean visitors visiting the website, navigating within the website and performing actions within the website.

According to the method of the first aspect of the invention, a plurality of visitors is initially allowed to visit the website. During each visit the navigations and/or actions performed by the visitor are monitored, while accumulating value points. Value point settings have previously been associated with content of the website, and the value points of a given visit are accumulated in accordance with these settings, and in accordance with the navigations and/or actions performed by the visitor. Thus, when a visitor encounters a specific piece of content, the value points are adjusted with an amount corresponding to the value point setting associated with that piece of content.

In the present context the term 'content' should be interpreted to include anything which a visitor may experience during a visit to the website, including content presented to the visitor, such as webpages, images, video sequences, audible sequences, etc., actions performed by the visitor, including forms being filled in, searches performed within the website, tests, polls, etc., or any other kind of content which the visitor may experience or encounter during a visit to the website.

Accordingly, at the end of a visit, an accumulated value point score has been obtained, which reflects the value point 'collected' by the visitor during the visit. If the value point settings are selected and assigned in an appropriate manner, the accumulated value point score may reflect the value which the visit generated to the website owner, i.e. it is a measure for how valuable the visit was.

Furthermore, an origin of the visit, leading the visitor to the website, is registered. The origin of the visit provides information regarding where the traffic came from. It may, e.g., be a specific search engine, a direct entry via the browser, following a link in a web advertisement, following a link in an e-mail campaign, following a link from a blog, etc.

Finally, a landing webpage for the visit is registered. In the present context the term 'landing webpage' should be interpreted to mean the first webpage of the website which the visitor visits when arriving from the origin of the visit. The landing webpage is designated by the origin, i.e. the origin, when directing the visitor to the website, determines which webpage of the website the visitor is directed to. The landing webpage may, e.g., be a front page of the website. Alternatively, it may be any other webpage of the website. In the case that the origin of the visit is a search engine, the landing webpage designated by the origin will most likely be the webpage which the search engine identifies as the webpage which best matches the search queries entered by the visitor.

Once a plurality of visitors has been allowed to visit the website, and the steps described above have been performed for each visit, the obtained accumulated value point scores and the registered origins and landing webpages of the plurality of visits are analysed. Thereby correlated information regarding generated value for the website owner, origin and landing webpages is obtained.

Finally, the result of the analysing step is used for determining whether or not traffic originating from a specific origin, and having a specific landing webpage, should be redirected to a target webpage, being a webpage of the website which is different from the designated landing webpage. If the analysis step reveals that traffic originating from a specific origin and having the target webpage as landing webpage tend to generate more value for the website owner than traffic originating from the same origin, but having a different landing webpage, it may be an advantage for the website owner to redirect traffic originating from the specific origin to the target webpage, because it seems that this will increase the total value generated for the website owner by the traffic originating from the specific origin. If a specific visit is redirected from the landing webpage which was designated by the origin to the target webpage, the visitor will simply experience that the target webpage is the landing webpage of the visit, i.e. the target webpage is the first webpage of the website which the visitor sees during the visit.

Thus, according to the method of the first aspect of the invention, the traffic is directed towards webpages which are known to generate high value for the website owner. Thereby the total value generated for the website owner is likely to increase. Furthermore, the visitors will most likely experience that they are immediately directed to a webpage which is highly relevant.

The method may further comprise the steps of:
analysing the redirected traffic, and
determining whether or not the redirection improves value generated for the website owner by the visitors, based on the analysis of the redirected traffic.

According to this embodiment, it is investigated whether or not the redirection of the traffic to the target website actually results in an increase in the value generated for the website owner by the visitors visiting the website.

The method may further comprise the step of generating a warning in the case that the determining step reveals that the value generated for the website owner by the visitors is not increased by the redirection. In response to such a warning, the website owner or administrator may determine to stop the redirection of the traffic to the target webpage. Alternatively, a different target webpage may be selected, based on the analysis step. As another alternative, the system may automatically discontinue the redirection in the case that the determining step reveals that the value generated for the website owner is not increased by the redirection. This may even be done without generating a warning.

The analysing step may comprise the step of, for each origin and for each webpage of the website, calculating an efficiency being the sum of accumulated value point scores of visits originating from the origin and having the webpage as landing webpage, divided by the number of visits originating from the origin and having the webpage as landing webpage. Thus, the efficiency of a given combination of origin and landing webpage provides a measure for the average generated value per visitor visiting the website, the visitors originating from that specific origin and having that specific webpage as landing webpage. Thereby, according to this embodiment, the determining step is performed on the basis of how much value each visitor generated in average.

The redirection of future traffic may, in this case, be performed in such a manner that traffic is directed towards a webpage having a maximum efficiency.

Alternatively or additionally, the analysis step may comprise investigating the total value generated by the visitors, in which case the amount of traffic directed towards the website is also taken into account, and not just the efficiency.

The origin of at least one visit may include a referral which referred the visitor to the website. In this case the origin of at least one visit may include a referral domain which referred the visitor to the website. The referral may be another website, e.g. a search engine, a web based advertisement, a blog, an e-mail campaign, etc. Alternatively or additionally, the origin of the visit may include directly typing the address of the website into the browser.

The origin of at least one visit may include a referral domain and path which referred the visitor to the website, such as a referral domain and path and one or more parameters which referred the visitor to the website.

The step of registering an origin of the visit(s) including a referral may further comprise registering one or more search keywords applied by the visitor. For instance, in the case that the origin of the visit is a search engine, it is relevant to know which search keywords the visitor applied in order to be able to direct the visitor to the webpage of the website which is most relevant for the visitor, since the search keywords reflects what the visitor is looking for.

Alternatively or additionally, the step of registering an origin of the visit(s) including a referral may further comprise registering one or more campaigns, banners and/or other parameters indicating a choice made by the visitor. Such information also reflects what the visitor is looking for, and may, e.g., include social network information originating from relevant social networks, such as Facebook. Social networks, such as Facebook, may provide valuable information regarding the visitor, such as the age of the visitor. Information of this kind may, however, also be obtained in other ways, e.g. via Google®. Accordingly, it is also relevant to use such information in order to be able to direct the visitor to the webpage of the website which is most relevant for the visitor.

The predefined value point settings may reflect value obtained by the owner of the website due to navigations and/or actions performed by the visitor during the visit. According to this embodiment, the website owner or manager defines the value point setting in such a manner that navigations and/or actions which the website owner wants the visitor to perform and/or which generate value for the owner of the website, generate a high value point score. Accordingly, a high value point score for a visit indicates that the website owner gained a lot of value from the visit. Examples of high value behaviour may include, but is not limited to, purchasing a product via the website, requesting a web based demo, ordering a catalogue, requesting a personal contact, visiting at least a predefined number of web pages of the website, etc.

The step of determining to redirect future website traffic may be performed automatically. According to this embodiment, the system automatically directs the traffic towards a target webpage which, based on the analysis step, is expected to generate maximum value for the website owner. In addition, a message may be generated for the website owner or administrator in order to inform about the redirection. Alternatively, the determining step may be performed manually by the website owner or administrator in response to a message or warning generated on the basis of the analysing step.

The method may further comprise the step of generating a recommendation to a website administrator, said recommendation including suggesting changes to be performed to the website. The step of suggesting changes may, e.g., comprise suggesting changes to the structure of the website. Changes to the structure of the website may, e.g., include changes to menus, such as changes to the order of menu points in order to arrange the most relevant and/or the most value generating menu points on top. This may be desirable, because visitors are more likely to select the menu point arranged on the top of the menu than a menu point arranged further down the list. Alternatively or additionally, suggested changes to the structure of the website may include deleting webpages, highlighting links, rearranging links, rearranging content within a webpage, etc.

The method may further comprise the step of redirecting all traffic originating from a specific origin to a predetermined webpage of the website, said step being performed prior to the step of allowing a plurality of visitors to visit the website. According to this embodiment, a predetermined webpage is initially selected as a preferred landing webpage for traffic originating from a specific origin. The predetermined webpage may, e.g., be the front page of the website, or it may be another webpage which is considered the most relevant webpage for visitors originating from the specific origin and/or which is expected to generate high value for the website owner.

Once the predetermined webpage has been selected, all traffic originating from the specific origin is redirected to the predetermined webpage. Then a plurality of visitors is allowed to visit the website, and the monitoring, registering, analysing and determining steps described above are performed. Thus, according to this embodiment, the analysing step may reveal that the predetermined webpage is in fact an optimal landing webpage, and the determining step may therefore result in the predetermined webpage being selected as the target webpage, i.e. the redirection of traffic to the predetermined webpage is continued. Alternatively, the analysing step may reveal that the predetermined webpage is not the optimal landing webpage, and the determining step may therefore result in a different webpage being selected as the target webpage.

The analysing step may comprise comparing the obtained accumulated value point scores to a parameter indicative for value generated for a website owner by visitors visiting the website prior to performing the redirecting step. This may be used for evaluating whether or not the predetermined webpage is an optimal landing page in terms of value generated for the website owner, as described above.

The predetermined webpage may be selected as the target webpage. As described above, this may, e.g., be done in the case that the analysis step reveals that the predetermined webpage is in fact an optimal landing webpage.

According to a second aspect the invention provides a system for analysing traffic on a website arranged on a server, the website comprising at least two webpages, the system comprising:
- a monitoring module adapted to monitor navigations and/or actions performed by a visitor during a visit to the website, said monitoring module further being adapted to accumulate value points in accordance with content viewed by the visitor and actions performed by the visitor, and in accordance with predefined value point settings associated with content of the website, thereby obtaining an accumulated value point score for the visit,
- a registering module adapted to register an origin of the visit, leading the visitor to the website, and to register a landing webpage being the first webpage of the website which the visitor visits when arriving from the origin of the visit, said landing webpage being designated by the origin,
- an analysis module adapted to analyse obtained accumulated value point scores and registered origins and landing webpages of a plurality of visits, and
- a redirection module adapted to redirect future website traffic originating from a specific origin to a target webpage of the website in response to an output generated by the analysis module.

It should be noted that a person skilled in the art would readily recognise that any feature described in combination with the first aspect of the invention could also be combined with the second aspect of the invention, and vice versa.

The system according to the second aspect of the invention may advantageously be used for performing the method according to the first aspect of the invention, and the remarks set forth above with reference to the first aspect of the invention are therefore equally applicable here.

The system may be residing on the server having the website arranged thereon.

BRIEF DESCRIPTION OF THE DRAWINGS

The invention will now be described in further detail with reference to the accompanying drawings in which.

DETAILED DESCRIPTION OF THE DRAWINGS

Figure 1:
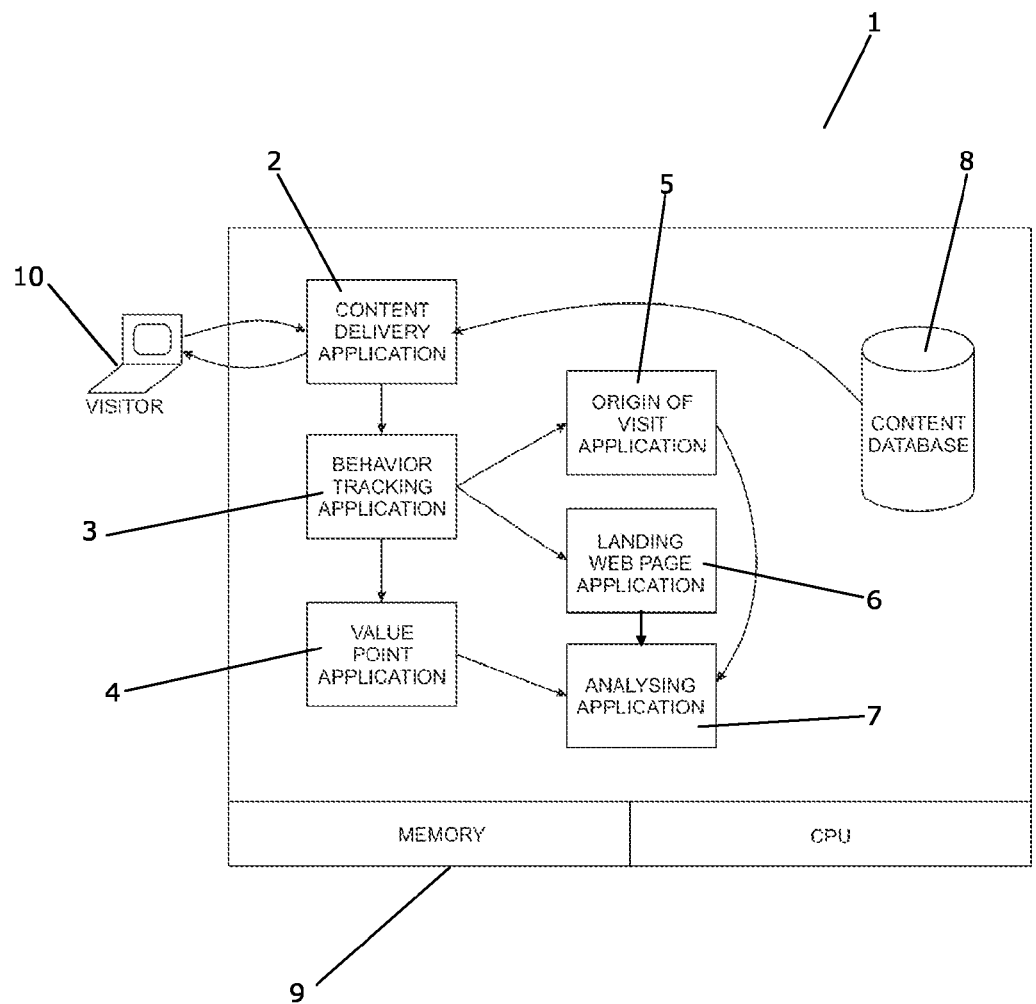
FIG. 1 is a diagrammatic view of a system according to a first embodiment of the invention.

FIG. 1 is a diagrammatic view of a system 1 according to a first embodiment of the invention. The system 1 is suited for being used for analysing traffic on a website. The system 1 comprises a content delivery application 2, a behaviour tracking application 3, a value point application 4, an origin of visit application 5, a landing webpage application 6, an analysing application 7 and a content database 8, all residing on a server 9. The server 9 could be a single device, or it could be two or more separate devices being interlinked in a manner which allows the separate devices to communicate in such a way that they act as a single device.

A visitor accesses the content of the website via a client device 10, and the content delivery application 2 delivers content to the client device 10 upon request from the visitor, thereby allowing the visitor to view desired content and/or perform desired actions within the website. The content is supplied to the content delivery application 2 by the content database 8. In FIG. 1 the client device 10 is illustrated as a personal computer (PC), but it should be noted that the client device 10 could alternatively be a cell phone, a tablet, a TV, or any other suitable kind of client device allowing the visitor to access the website content.

While the visitor navigates the website, the behaviour tracking application 3 monitors the navigations and/or actions performed by the visitor. During this, the behaviour tracking application 3 and the value point application 4 in cooperation accumulate value points for the visit. The value points are accumulated in accordance with the content viewed by the visitor and/or actions performed by the visitor during the visit. Previously, the content of the website has been associated with value point settings reflecting the value generated for the website owner when a visitor encounters specific content of the website. Thus, when a visitor views a specific piece of content or performs a specific action, value points corresponding to the viewed content or performed action are added to the value point score for the visit. Accordingly, when the visit is completed, a value point score for the visit has been obtained, and the value point score represents the value generated for the website owner during the visit.

Simultaneously, the behaviour tracking application 3 and the origin of visit application 5 in cooperation register an origin of the visit. The origin of the visit provides information regarding where the traffic came from. It may, e.g., be a specific search engine, a direct entry via the browser, following a link in a web advertisement, following a link in an e-mail campaign, following a link from a blog, etc.

Simultaneously, the behaviour tracking application 3 and the landing webpage application 6 in cooperation register a landing webpage of the visit. The landing webpage is the webpage of the website which the visitor first visits when arriving from the origin of the visit. The landing webpage is designated by the origin, i.e. the origin, when directing the visitor to the website, determines which webpage of the website the visitor is directed to. The landing webpage may, e.g., be a front page of the website. Alternatively, it may be any other webpage of the website. In the case that the origin of the visit is a search engine, the landing webpage designated by the origin will most likely be the webpage which the search engine identifies as the webpage which best matches the search queries entered by the visitor.

The value point application 4, the origin of visit application 5 and the landing webpage application 6 communicate the accumulated value points, the origin of the visit and the landing webpage, respectively, registered during the visit to the analysing application 7. Thus, correlated information regarding accumulated value points, origin and landing webpage of the visit is received at the analysing application 7. At the analysing application 7, received information from a plurality of visits is analysed. Based on this analysis, it is determined whether or not future traffic to the website should be redirected to a target webpage of the website which is different from the landing webpage which is designated by the origin. This will be described in further detail below with reference to FIGS. 3 and 4. Furthermore, an administrator may access the analysing application 7 in order to request analysis of the obtained information regarding visits to the website and/or in order to retrieve the results of such analysis. This will be described in further detail below with reference to FIGS. 3 and 4.

Figure 2:
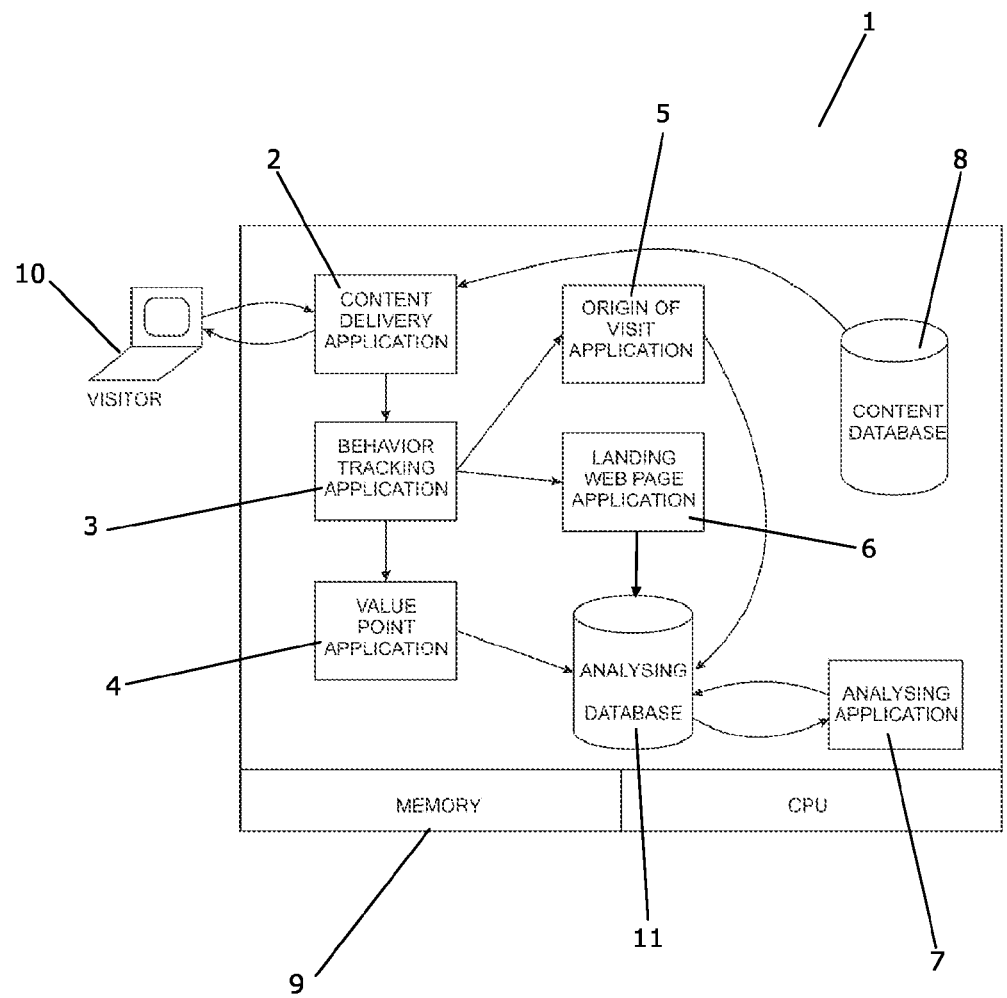
FIG. 2 is a diagrammatic view of a system according to a second embodiment of the invention.

FIG. 2 is a diagrammatic view of a system 1 according to a second embodiment of the invention. The system 1 of FIG. 2 is very similar to the system 1 of FIG. 1, and it will therefore not be described in detail here.

The system 1 of FIG. 2 further comprises an analysing database 11. Thus, in the embodiment illustrated in FIG. 2, the value point application 4, the origin of visit application 5 and the landing webpage application 6 communicate the accumulated value points, the origin of the visit and the landing webpage, respectively, registered during the visit to the analysing database 11, where this information is stored. Subsequently, the analysing application 7 can retrieve the stored information from the analysing database 11 in order to perform analysis as described above. The analysing application 7 may further communicate the result of the analysis to the analysing database 11. In this case the analysing database stores analysis results as well as information obtained during the individual visit.

Figure 3:
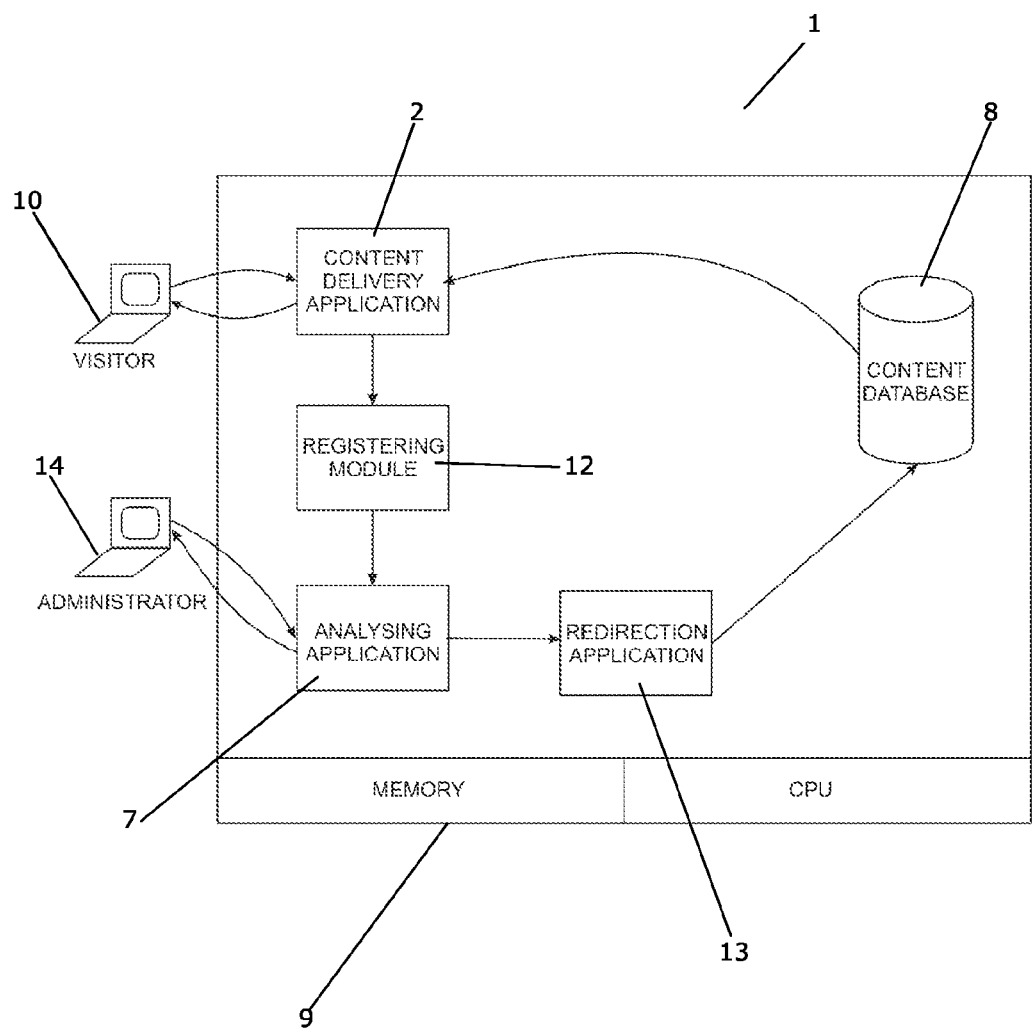
FIG. 3 is a diagrammatic view of a system according to a third embodiment of the invention.

FIG. 3 is a diagrammatic view of a system 1 according to a third embodiment of the invention. The system 1 is suited for being used for analysing traffic on a website. The system 1 comprises a content delivery application 2, a registering module 12, an analysing application 7, a redirection application 13 and a content database 8, all residing on a server 9. The server 9 could be a single device, or it could be two or more separate devices being interlinked in a manner which allows the separate devices to communicate in such a way that they act as a single device.

Similar to the situation described above with reference to FIG. 1, a visitor accesses the content of the website via a client device 10, and the content delivery application 2 delivers content to the client device 10 upon request from the visitor, thereby allowing the visitor to view desired content and/or perform desired actions within the website. The content is supplied to the content delivery application 2 by the content database 8.

While the visitor navigates the website, the registering module 12 registers details regarding the visit. The registering module 12 may, e.g., include the behaviour tracking application 3, the value point application 4, the origin of visit application 5 and the landing webpage application 6 illustrated in FIGS. 1 and 2 and described above.

The registering module 12 communicates the registered details regarding the visit to the analysing application 7. An administrator may then access the analysing application 7 via an administrator device 14. In FIG. 3 the administrator device 14 is illustrated as a personal computer (PC), but it should be noted that the administrator device 14 could alternatively be a cell phone, a tablet, a TV, or any other suitable kind of administrator device allowing the administrator to access the website. The administrator may then request analysis to be performed on the registered visit details which have previously been communicated to the analysing application 7 and/or the administrator may retrieve results of such performed analysis.

Based on the analysis performed by the analysing application 7 it is decided whether or not some of the future traffic on the website should be redirected from the landing webpage designated by the origin of the visit to a target webpage. The decision may be made by the administrator reviewing the result of an analysis performed by the analysing application 7. In this case the administrator may make the decision on the basis of an advice generated by analysis application 7. The decision is then communicated by the administrator to the analysing application 7, via the administrator device 14. As an alternative, the decision may be made completely by the analysing application 7, in which case the administrator is merely informed of the decision via the administrator device 14. In any event, in the case that it is decided that some of the future traffic should be redirected, the analysing application 7 communicates to the redirection application 13 which part of the traffic should be redirected, and whereto.

A redirection of traffic may, e.g., be decided in the following case. The analysing application 7 analyses information regarding accumulated value point scores, origin of visit and landing webpage obtained during a plurality of visits to the website. To this end it is investigated which combinations of origin of the visit and landing webpage generate high value point scores, and which combinations generate low value point scores. Based on this it is decided that future traffic originating from a given origin, and having a landing webpage which, according to the analysis, will result in a low value point score, shall be redirected to a target webpage corresponding to a landing webpage which has been indentified as generating high value point scores in combination with the given origin. Thereby it must be expected that the redirected future traffic will generate more value for the website owner than would be the case if the traffic was not redirected.

Upon receipt of information that some future traffic shall be redirected, the redirection application 13 communicates this to the content database 8. Accordingly, when a visitor subsequently accesses the website, from an origin and with a designated landing webpage which gives rise to a redirection, the content database 8 will ensure that the visitor accesses the target webpage rather than the designated landing webpage. Alternatively or additionally, information regarding the redirection may be stored in other places, e.g. in a redirection database.

Figure 4:
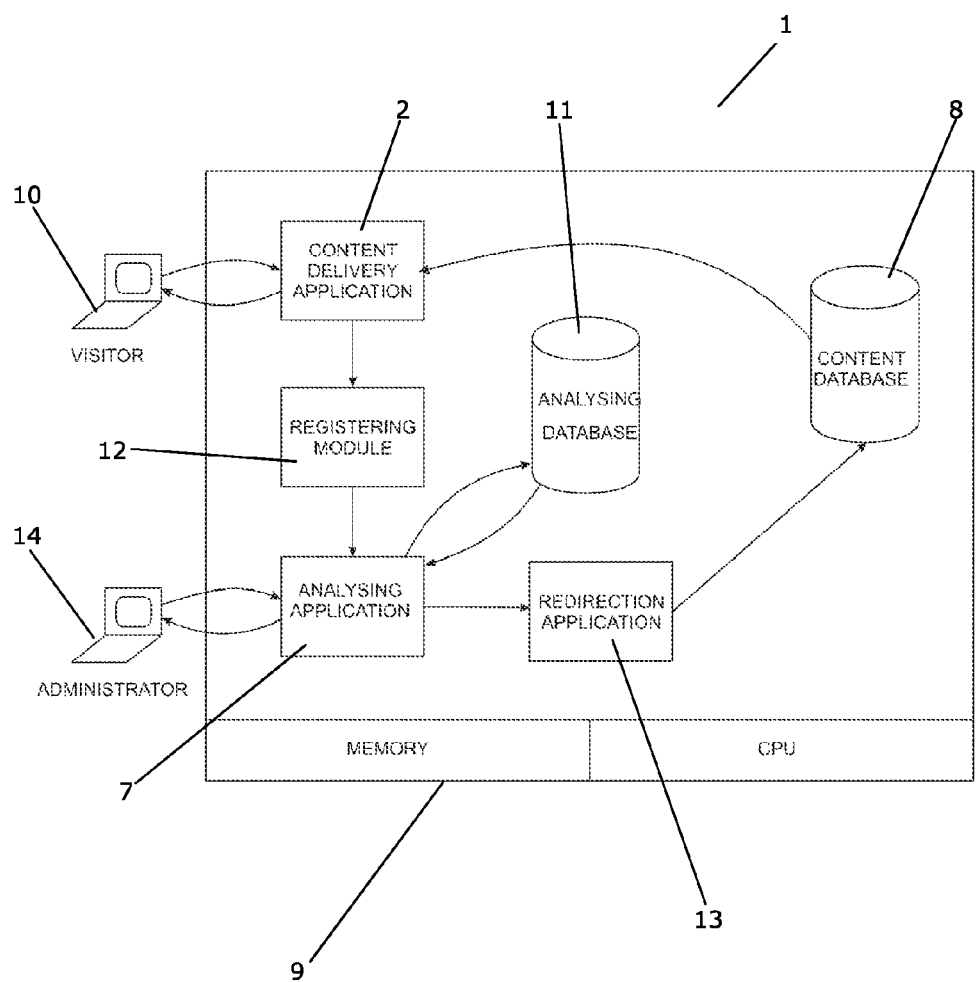
FIG. 4 is a diagrammatic view of a system according to a fourth embodiment of the invention.

FIG. 4 is a diagrammatic view of a system 1 according to a fourth embodiment of the invention. The system 1 of FIG. 4 is very similar to the system 1 of FIG. 3, and it will therefore not be described in further detail here.

The system 1 of FIG. 4 further comprises an analysing database 11. The registering module 12 may communicate the obtained information to the analysing application 7 for analysis as well as to the analysing database 11 for storage. As an alternative, the registering module 12 may only communicate with one of the analysing application 7 and the analysing database 11. Furthermore, the analysing application 7 and the analysing database 11 may communicate in order to exchange obtained information and/or analysis results in the manner described above with reference to FIG. 2.

Figure 5:
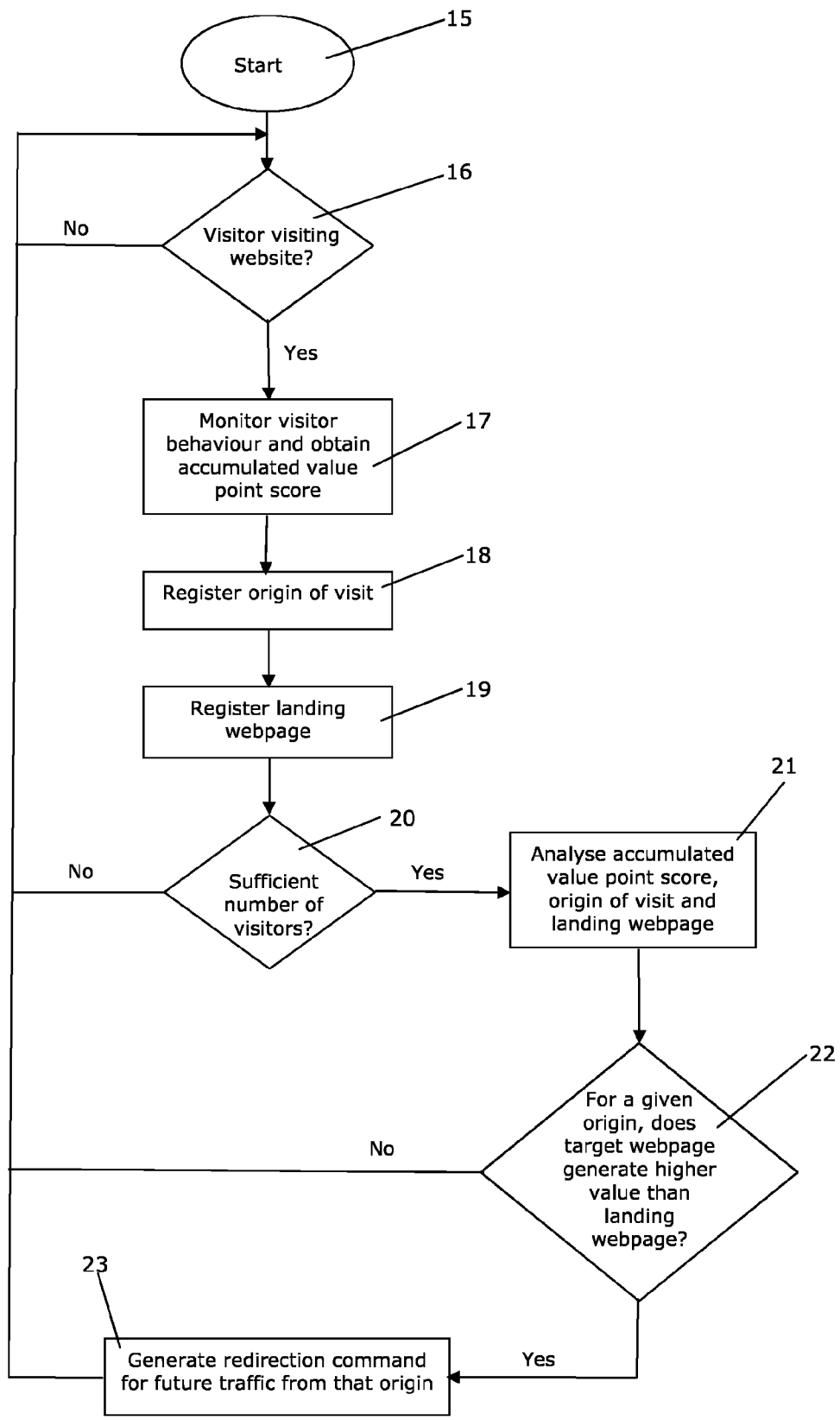
FIG. 5 is a flow diagram illustrating a method according to an embodiment of the invention.

FIG. 5 is a flow diagram illustrating a method according to an embodiment of the invention. The process is started at step 15. At step 16 it is investigated whether or not a visitor is visiting the website. If this is not the case, the process is returned to step 16, i.e. the website is monitored until a visitor is detected.

If step 16 reveals that a visitor is visiting the website, the behaviour of the visitor is monitored at step 17. This results in an accumulated value point score being obtained. The value points are accumulated in accordance with content viewed by the visitor and actions performed by the visitor, and in accordance with predefined value point settings associated with the content of the website. The value point settings have been assigned to the content previously, e.g. when the content was created, by the website owner or manager. The value point settings are selected in such a manner that they reflect value generated for the website owner when a visitor views specific content or performs specific actions. When a visitor visits the website, a value point score is accumulated by continuously adding values defined by the value point settings. Thus, when a visitor views a specific piece of content or performs a specific action, the value point setting associated with that specific piece of content or action is added to the value point score of the visit. When the visit is completed, an accumulated value point score has been generated, and the accumulated value point score reflects the total value generated for the website owner during the visit.

At step 18 the origin of the visit is registered. The origin of the visit provides information regarding where the traffic came from. It may, e.g., be a specific search engine, a direct entry via the browser, following a link in a web advertisement, following a link in an e-mail campaign, following a link from a blog, etc.

At step 19 a landing webpage of the visit is registered. The landing webpage is the first webpage which the visitor visits when arriving from the origin. The landing webpage is designated by the origin. For instance, the landing webpage may be the webpage which the origin considers to be most relevant for the visitor, e.g. based on key words or search terms entered by the visitor at a search engine.

It should be noted that the sequence of steps 17, 18 and 19 is not essential in the sense that they may be performed in any desired order. For instance, the landing webpage may be registered before monitoring the behaviour of the visitor, in which case step 19 is performed prior to step 17, etc., as long as all three steps 17, 18 and 19 are performed for each visit.

Accordingly, for each visit, information regarding accumulated value point score, origin of the visit and landing webpage is obtained.

At step 20 it is investigated whether or not a sufficient number of visitors have visited the website, i.e. whether or not a sufficient number of accumulated value point scores, origins of visits and landing webpages have been obtained. If this is not the case, the process is returned to step 16 in order to obtain further accumulated value point scores and origins of visits.

In the case that step 20 reveals that a sufficient number of visitors have visited the website the obtained accumulated value point scores and the registered origins and landing webpages are analysed at step 21. In the present context the term 'sufficient' should be interpreted to mean that the number of visitors having visited the website is high enough to allow statistical analysis to be performed on the obtained data. For instance, the number of visitors could correspond to a given fraction of a given population of visitors, the fraction providing an acceptable confidence level in the subsequent analysis. The analysis may reveal that, for a specific origin, some landing webpages tend to result in lower accumulated value point scores than other landing webpages.

At step 22 it is investigated whether or not, for a given origin, a target webpage is likely to generate higher accumulated value point scores than the landing webpage. This is done on the basis of the analysis performed at a step 21. The target webpage could, e.g., be a landing webpage which tends to generate high value point scores. Alternatively or additionally, the website administrator may be requested to provide an alternative target webpage.

If step 22 reveals that a target webpage is not likely to generate higher accumulated value point scores than the landing webpage, then the process is returned to step 16, and the landing webpage for future traffic from the specific origin is maintained.

If step 22 reveals that a target webpage is likely to generate higher accumulated value point scores than the landing webpage, then it is decided, at step 23, that future traffic originating from the specific origin and having the landing webpage, is redirected to the target webpage. Thereby it must be expected that the accumulated value point scores of the future traffic are increased. Subsequently, the process is returned to step 16 to allow further visitors to visit the website, but now with the redirection of the traffic originating from the specific origin.

The invention claimed is:

1. A method for analysing traffic on a website, the website being arranged on a server, and the website comprising at least two webpages, the method comprising the steps of:
    obtaining a parameter being indicative for value generated for a website owner by visitors visiting the website, and originating from a specific origin,
    redirecting all traffic originating from the specific origin to a predetermined webpage of the website,
    allowing a plurality of visitors to visit the website,
    for each visit:
        monitoring navigations and/or actions performed by the visitor during the visit while accumulating value points in accordance with content viewed by the visitor and actions performed by the visitor, and in accordance with predefined value point settings associated with content of the website, thereby obtaining an accumulated value point score for the visit,
        registering an origin of the visit, leading the visitor to the website, and
        registering a landing webpage being the first webpage of the website which the visitor visits when arriving from the origin of the visit, said landing webpage being designated by the origin,
    analysing obtained accumulated value point scores and registered origins and landing webpages of the plurality of visits, said analysis including comparing the obtained accumulated value point scores to the previously obtained parameter being indicative for value generated for the website owner by visitors, and
    determining, based on the comparison, to redirect future website traffic originating from a specific origin, and having a specific landing webpage, to a target webpage of the website in the case that the analysing step reveals that visits originating from the specific origin obtain higher accumulated value point scores when the first webpage visited by the visitor is the target webpage than when the first webpage visited by the visitor is the landing webpage which was designated by the origin.

2. The method according to claim 1, further comprising the steps of:
    analysing the redirected traffic, and
    determining whether or not the redirection improves value generated for the website owner by the visitors, based on the analysis of the redirected traffic.

3. The method according to claim 1, wherein the analysing step comprises the step of, for each origin and for each webpage of the website, calculating an efficiency being the sum of accumulated value point scores of visits originating from the origin and having the webpage as landing webpage, divided by the number of visits originating from the origin and having the webpage as landing webpage.

4. The method according to claim 1, wherein the origin of at least one visit includes a referral which referred the visitor to the website.

5. The method according to claim 1, wherein the predefined value point settings reflect value obtained by the owner of the website due to navigations and/or actions performed by the visitor during the visit.

6. The method according to claim 1, wherein the step of determining to redirect future website traffic is performed automatically.

7. The method according to claim 1, further comprising the step of generating a recommendation to a website administrator, said recommendation including suggesting changes to be performed to the website.

8. The method according to claim 1, wherein the predetermined webpage is selected as the target webpage.

9. The method according to claim 2, further comprising the step of generating a warning in the case that the determining step reveals that the value generated for the website owner by the visitors is not increased by the redirection.

10. The method according to claim 3, wherein the redirection of future traffic is performed in such a manner that traffic is directed towards a webpage having a maximum efficiency.

11. The method according to claim 4, wherein the origin of at least one visit includes a referral domain which referred the visitor to the website.

12. The method according to claim 4, wherein the step of registering an origin of the visit(s) including a referral further comprises registering one or more search keywords applied by the visitor.

13. The method according to claim 4, wherein the step of registering an origin of the visit(s) including a referral further comprises registering one or more campaigns, banners and/or other parameters indicating a choice made by the visitor.

14. The method according to claim 7, wherein the step of suggesting changes comprises suggesting changes to the structure of the website.

15. The method according to claim 11, wherein the origin of at least one visit includes a referral domain and path which referred the visitor to the website.

16. The method according to claim 15, wherein the origin of at least one visit includes a referral domain and path and one or more parameters which referred the visitor to the website.

17. A system for analysing traffic on a website arranged on a server, the website comprising at least two webpages, the system comprising:
    a monitoring module adapted to monitor navigations and/or actions performed by a visitor during a visit to the website, said monitoring module further being adapted to accumulate value points in accordance with content viewed by the visitor and actions performed by the visitor, and in accordance with predefined value point settings associated with content of the website, thereby obtaining an accumulated value point score for the visit,
    a registering module adapted to register an origin of the visit, leading the visitor to the website, and to register a landing webpage being the first webpage of the website which the visitor visits when arriving from the origin of the visit, said landing webpage being designated by the origin,
    an analysis module adapted to analyse obtained accumulated value point scores and registered origins and landing webpages of a plurality of visits, said analysis module being adapted to compare value point scores obtained prior to and after redirection of traffic, and
    a redirection module adapted to redirect future website traffic originating from a specific origin to a target webpage of the website in response to an output generated by the analysis module.

18. The system according to claim 17, said system residing on the server having the website arranged thereon.

* * * * *